United States Patent
Zhang et al.

(10) Patent No.: US 10,528,145 B1
(45) Date of Patent: Jan. 7, 2020

(54) SYSTEMS AND METHODS INVOLVING GESTURE BASED USER INTERACTION, USER INTERFACE AND/OR OTHER FEATURES

(71) Applicant: ARCHER SOFTWARE CORPORATION, Fremont, CA (US)

(72) Inventors: Weijie Zhang, Fremont, CA (US); Joseph McGee, Los Angeles, CA (US)

(73) Assignee: Archer Software Corporation, Fremont, CA (US)

( * ) Notice: Subject to any disclaimer, the term of this patent is extended or adjusted under 35 U.S.C. 154(b) by 446 days.

(21) Appl. No.: 14/290,972

(22) Filed: May 29, 2014

Related U.S. Application Data

(60) Provisional application No. 61/828,280, filed on May 29, 2013, provisional application No. 61/844,582, filed on Jul. 10, 2013.

(51) Int. Cl.
*G06F 3/01* (2006.01)
*G06F 3/042* (2006.01)
*G06F 3/00* (2006.01)

(52) U.S. Cl.
CPC .......... *G06F 3/017* (2013.01); *G06F 3/0425* (2013.01); *G06F 3/005* (2013.01); *G06F 3/011* (2013.01); *G06F 3/012* (2013.01)

(58) Field of Classification Search
CPC .............. G06F 3/0317; G06F 3/04883; G06F 3/03545; G06F 17/242; G06F 3/011; G06F 3/012; G06F 3/017; G06F 3/0425; G06F 3/005; G09G 2340/10; G09G 2320/0247

USPC .................................... 345/156–184
See application file for complete search history.

(56) References Cited

U.S. PATENT DOCUMENTS

| | | | |
|---|---|---|---|
| 2008/0244468 A1 | 10/2008 | Nishihara et al. | |
| 2008/0252737 A1* | 10/2008 | Morehouse et al. | 348/222.1 |
| 2008/0297360 A1* | 12/2008 | Knox et al. | 340/628 |
| 2009/0183125 A1* | 7/2009 | Magal et al. | 715/863 |
| 2011/0080490 A1* | 4/2011 | Clarkson et al. | 348/222.1 |
| 2011/0273551 A1* | 11/2011 | Yang et al. | 348/77 |
| 2012/0005632 A1 | 1/2012 | Broyles, III et al. | |
| 2012/0223882 A1 | 9/2012 | Galor et al. | |

(Continued)

OTHER PUBLICATIONS

International Search Report and Written Opinion for PCT/US2014/040099 dated Dec. 16, 2014, 18 pgs.

(Continued)

*Primary Examiner* — William Boddie
*Assistant Examiner* — Saifeldin E Elnafia
(74) *Attorney, Agent, or Firm* — DLA Piper LLP US

(57) ABSTRACT

Systems, methods, computer readable media and articles of manufacture consistent with innovations herein are directed to gesture based user interaction, user interface and/or other features. According to one illustrative implementation, for example, an illustrative operating system may comprise an input program using images from one or more cameras to analyze and interpret user gestures, may (in some implementations) involve an operating system based on Linux kernel with access to local disks and files, and/or may include or involve a graphical user interface outputting the cursor corresponding to user gestures and providing a uniquely designed interaction between the gestures and content. Additional aspects for interacting with other/multiple devices are also disclosed.

19 Claims, 13 Drawing Sheets

(56) References Cited

U.S. PATENT DOCUMENTS

2013/0201104 A1* 8/2013 Ptucha et al. .............. 345/158
2014/0267031 A1* 9/2014 Huebner .............. G06F 3/0346
                345/158

OTHER PUBLICATIONS

Invitation to Pay Additional Fees and, Where Applicable, Protest Fee for PCT/US2014/040099, dated Oct. 24, 2014, 3 pgs.

\* cited by examiner

SYSTEMS AND METHODS INVOLVING GESTURE BASED USER INTERACTION, USER INTERFACE AND/OR OTHER FEATURES

CROSS-REFERENCE TO RELATED APPLICATIONS INFORMATION

This application claims benefit of priority to provisional patent application No. 61/828,280, filed May 29, 2013 and provisional patent application No. 61/844,582, filed Jul. 10, 2013, which are incorporated herein by reference in entirety.

APPENDIX

This application incorporates the attached Appendix of computer code and representative processes in connection with which certain implementations and/or aspects of the innovations herein may be utilized.

FIELD

Innovations herein pertain to display devices including television devices, and more particularly, to cable TV set-top boxes, media player boxes, smart televisions (Smart TVs), game consoles, devices with internet connection capability and/or access to cable media, PC-class, smartphone-class and/or tablet-class application platforms including but not limited to Linux ecosystem and Android App Store.

DESCRIPTION OF RELATED INFORMATION

TV has evolved rapidly over the last 25 years. While the high definition viewing experience has greatly enhanced television and content is seemingly unlimited, the TV user interface has not changed significantly in that time. Internet content and services, along with PC-class, smartphone-class and tablet-class applications are available online, but users have very few content choices on the television platform, mainly because of the limitations of conventional television interaction methods, mainly the remote control user interface. For example, the current remote control user interface (UI) becomes very hard to use when navigating large amounts of media, and the functionalities and applications on Smart TVs are limited by the solid buttons on a controller. The remote control UI, which is more akin to the solid keyboards on cellphones than the touch screens on smartphones, is not user-friendly.

OVERVIEW OF SOME ASPECTS

Systems, methods, computer readable media and articles of manufacture consistent with innovations herein may include or involve an operating system, such as a smart TV operating system, integrated with related devices such as television sets, cable TV set-top boxes, media player boxes and game consoles as an operating system. One illustrative system may be a smart TV operating system including an input program using images from one or more cameras to analyze and interpret user gestures. According to some implementations, systems and methods herein may be Linux kernel based with access to local disks and files, and/or may provide a uniquely designed interaction between the gestures and content. Further implementation may include one or more of a graphical user interface outputting the cursor corresponding to user gestures, a port connecting to cable, the Internet etc. to gain access to media content and application programs, and/or other aspects set forth below.

It is to be understood that both the foregoing general description and the following detailed description are exemplary and explanatory only and are not restrictive of the inventions, as described. Further features and/or variations may be provided in addition to those set forth herein. For example, the present inventions may be directed to various combinations and subcombinations of the disclosed features and/or combinations and subcombinations of several further features disclosed below in the detailed description.

BRIEF DESCRIPTIONS OF THE DRAWINGS

For a more complete understanding of the present disclosure and its advantages, reference is now made to the following description taken in conjunction with the accompanying drawings, in which like reference numerals represent like parts:

DETAILED DESCRIPTION OF ILLUSTRATIVE IMPLEMENTATIONS

Reference will now be made in detail to the inventions herein, examples of which are illustrated in the accompanying drawings. The implementations set forth in the following description do not represent all implementations consistent with the inventions herein. Instead, they are merely some examples consistent with certain aspects related to the present innovations. Wherever possible, the same reference numbers are used throughout the drawings to refer to the same or like parts.

To solve one or more of the drawbacks mentioned above and/or other issues, implementations herein may relate to one or more of gesture based input aspects, pointer application, Smart TV operating system, graphical user interface, cycling, multi-pointing, control priority and/or networking features.

In one exemplary implementation, an illustrative Smart TV Operating System may comprise an input program using images from one or more cameras to analyze and interpret user gestures, and may be an operating system based on Linux kernel with access to local disks and files, a graphical user interface outputting the cursor corresponding to user gestures and providing a uniquely designed interaction between the gestures and content, and a port connecting to cable and the Internet to gain access to media content and application programs.

Figure 1:
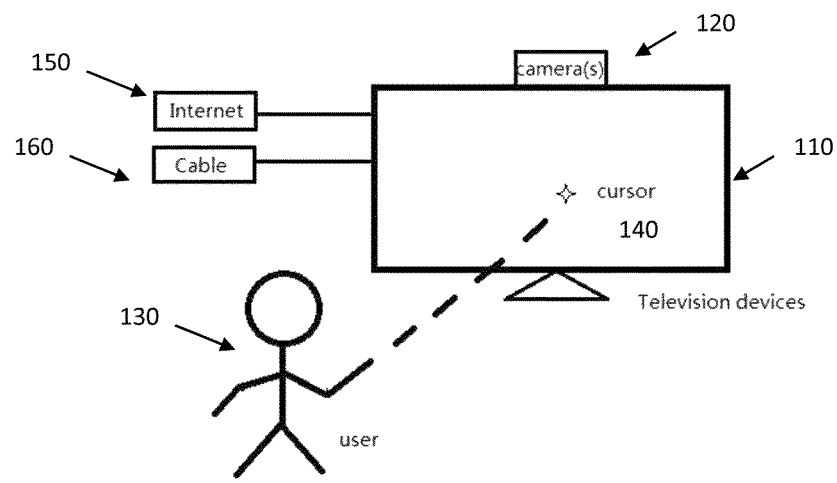
FIG. 1 is a conceptual diagram illustrating an exemplary system consistent with certain aspects related to innovations herein.

FIG. 1 is a conceptual diagram illustrating an exemplary system consistent with certain aspects related to innovations herein. In FIG. 1, a display 110 and one or more camera(s) 120 are provided where the display 110 generates a cursor 140 based on user 130 gesture inputs recorded by the camera(s) 120. The display 110 or related processing component(s) may be further connected to the internet 150 or cable 160 services. As the example system does not include associated and dedicated active illumination devices, those of ordinary skill in the art will appreciate that the camera(s) 120 are configured to capture ambient-lit images.

Figure 2:
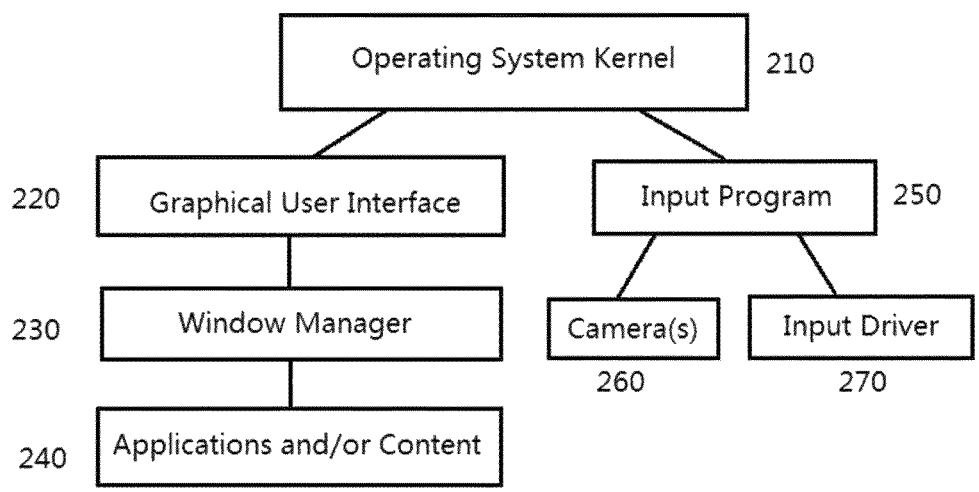
FIG. 2 is a block diagram illustrating an exemplary operating system consistent with certain aspects related to innovations herein.

FIG. 2 is a block diagram illustrating an exemplary operating system consistent with certain aspects related to innovations herein. Here, for example, a smart TV operating system may be built upon Linux kernel, and it may support most of the PC-class, smartphone-class and tablet-class programs and applications. It may also support television applications like the Guide, TV shopping, karaoke, and interactive commercials & shows. According to implementations herein, the operating system kernel 210 may include or involve a graphical user interface 220 and an input program 250. The graphical user interface 220 may include or involve a window manager 230 as well as applications and/or content 240. Further, the input program 250 may include or involve a camera 260 and/or an input driver 270.

According to implementations herein, the input program 250 may be a gesture based input program, such as 2D (2-dimensional) or 3D (3-dimensional) gesture based input program, having two applications enabling users to either use their hands as touch pads on laptops or use their hands as pointers at a distance away from the screen without wearing a device. According to some innovations, the distance may be about 2 to about 6 meters, though other distances and distances ranges are included within the scope of implementations herein.

A pointer application of the gesture based input program enables an end user to use a hand to point to a screen to interact with media, internet content, Apps and games on their smart TV in the same way as they use iPhones or iPads, but now remotely across the room. While the expression smart TV is used herein, it is understood that various other GUIs or screens are also within the ambit of some implementations herein. According to innovations herein, the cursor appears exactly at the position where the user is pointing to. In this way, if the user moves the cursor from one corner of the screen to another corner, the user does not need to make a coherent hand movement from one position to another position to move the cursor (similar to how a computer mouse works). Instead, the user only needs to stop pointing at the previous corner position and then point at the new corner position (like how a touch screen works, though now accomplished remotely herein).

Figure 3:
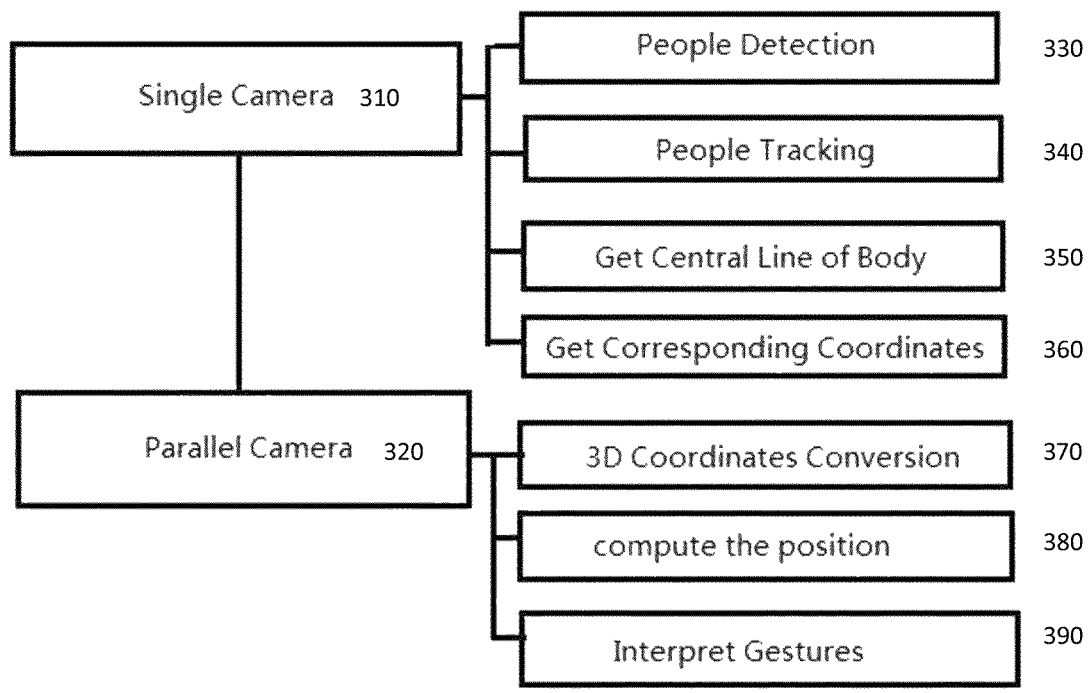
FIG. 3 is a block diagram illustrating an exemplary camera system consistent with certain aspects related to innovations herein.

FIG. 3 is a block diagram illustrating an exemplary camera system consistent with certain aspects related to innovations herein. Systems and methods herein may include or involve a single camera 310 or parallel cameras 320. Data captured from a single camera 310 is able to provide detection of people 330 and tracking 340 of such individual or users, including tracking of user movements/motions. The single camera 310 is further able to determine a line or central line of a user body 350 and determine respective coordinates 360 on a display screen corresponding to user movement. As the example system does not include associated and dedicated active illumination devices, those of ordinary skill in the art will appreciate that the single camera 310 and/or parallel cameras 320 are configured to capture ambient-lit images.

One illustrative processing operation for parallel cameras 320 is described below. Here, for example, the input program may begin by taking images from the two parallel cameras 320. When the user is captured in the camera images, the program processes images from each camera using background subtraction and human detection and analysis to find and build the contour of the human body. Then, the program may identify the contours of the user's front arm and hand, and calculate the coordinates of a central line of the front arm in the camera coordinates system. After that, the program may utilize two sets of camera coordinates of the front arm central line segments that correspond to each other from the two parallel camera images to construct one set of three-dimensional coordinates for the line segments of the user in the relevant coordinate system, such as the real world 3D coordinate system. In such 3D system(s), for example, based on the real 3D coordinates of the user's hand and the 3D coordinates of the locations of the two cameras and the TV screen that are initialized in the program, the program computes the position on the television screen that the user is pointing to and outputs the position to the operating system in real time. Also, in some implementations, the program may apply hand gesture recognition algorithms onto the contour information of the user's hands, and interprets the gestures in terms of various outputs/results, such as pointing, clicking and dragging. Because the cameras 320 are configured to capture ambient-lit images, those of ordinary skill in the art will appreciate that the processed images are ambient-lit images.

The gesture input program 250 may also include or involve a driver program 270, which delivers the result coordinates from the image processing component(s) to the operating system in real time, and also delivers the output signals, such as pointing, clicking and dragging.

Gesture based input innovations herein may further recognize the positions that multiple hands are pointing to such that the operating system supports multi-pointing input. Users may use multi-pointing input to zoom in or out, to rotate an item, etc. Further, when multiple users try to use the same operating system, determination of control of the system becomes an important issue. With multiple users, embodiments herein may provide face recognition and body recognition on all of the users so that the system recognizes the gestures and also recognizes the different users making the gestures. Here, for example, the operating system enables users to set control priorities for each person so that when two users are trying to use the same system, the person with the higher control priority will get the control over the operating system.

Gesture based input innovations herein may further recognize the real-world positions in 3D space that users are pointing to. When the users are pointing to an area within the screen, systems and methods herein enable interaction with the smart TV operating system. When users are pointing to an area outside of the screen, innovations herein allow user interaction with other external devices in that area through pointing, clicking and dragging gestures. Such innovations may be utilized if the system knows the position of a device in the 3D space and the system can communicate with that device. Accordingly, when a user is pointing to that device and making pointing, clicking or dragging gesture, the system determines that the user is interacting with that device and may send control signals to that device and receive information from that device to complete the interaction process.

Based on the positions of the devices in the 3D space with which the system may communicate, the operating system/platform creates a network for connected devices. Users may interact with any of the devices in the network through pointing, clicking or dragging gesture or with other inputs. Moreover, the devices share information and data with other devices in the network, and users may interact with multiple devices in the network at the same time. For example, users can use the dragging gesture to drag a song from the Smart TV screen to play on a stereo system connected with the network.

Figure 4:
FIG. 4 is an illustration of the main menu of the GUI for TV OS consistent with certain aspects related to innovations herein.

FIG. 4 is an illustration of an exemplary main menu 400 of a graphical user interface (GUI) for an operating system, such as a smart TV operating system, consistent with certain aspects related to innovations herein. The graphical user interface for television operating system (GUI for TV OS) is designed for a operating system that has an integrated cursor.

Figure 5:
FIGS. 5 and 6 are illustrations of the content navigation page of the GUI consistent with certain aspects related to innovations herein.
Figure 6:
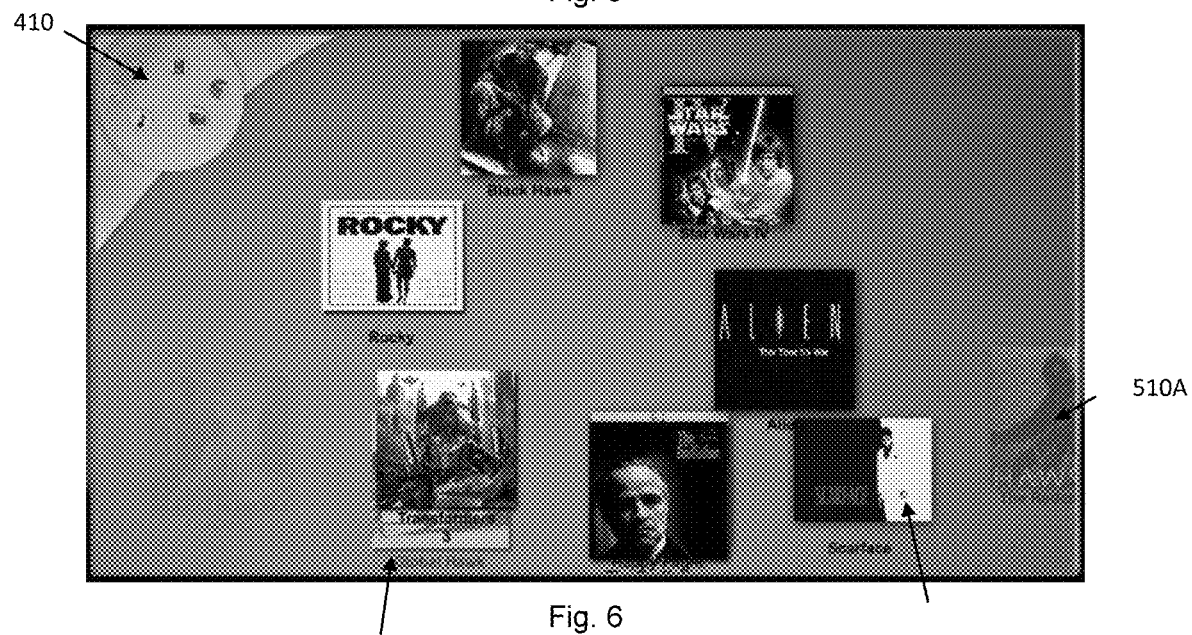

FIGS. 5 and 6 are illustrations of the content navigation page of the GUI consistent with certain aspects related to innovations herein. According to various systems and methods herein, an operating system and/or GUI may include or be designed based on the concept of cycling. In some implementations, on a main menu page for such cycling embodiments, icons of folders or Apps may be provided around the center of the screen. Users select an icon to access that folder or App. On the content navigation page shown in FIG. 5, for example, a certain number of items may be displayed on the screen, such as six movie posters. The main menu icon 410 is also displayed to allow a user to return to the main menu 400. As set forth below, cycling features herein enable users to drag the content items in a circle to navigate content items.

As shown in FIG. 6, when a user drags one item counter-clockwise to the next position, a new item will appear and flow from the left side of the display into the circle. The current items 610A will flow in the direction of the circle, and the first item 510A will flow out of the circle to the right side of the display and disappear. If the user continues dragging the item counter-clockwise, more new items will appear and flow into the circle and more current items 510B will flow out of the circle and disappear. Implementations may also be performed in clockwise order, which works in the opposite way.

Again, a home icon 410 may be included on the up-left corner of the page, and a user may select the home icon 410 to go back to the main menu 400. A user may select the item to play it and the content will be played in full screen. If a user clicks anywhere on the screen of the movie/content that is currently playing, the GUI will show the 'parallel' page of FIG. 7 as set forth below.

Figure 7:
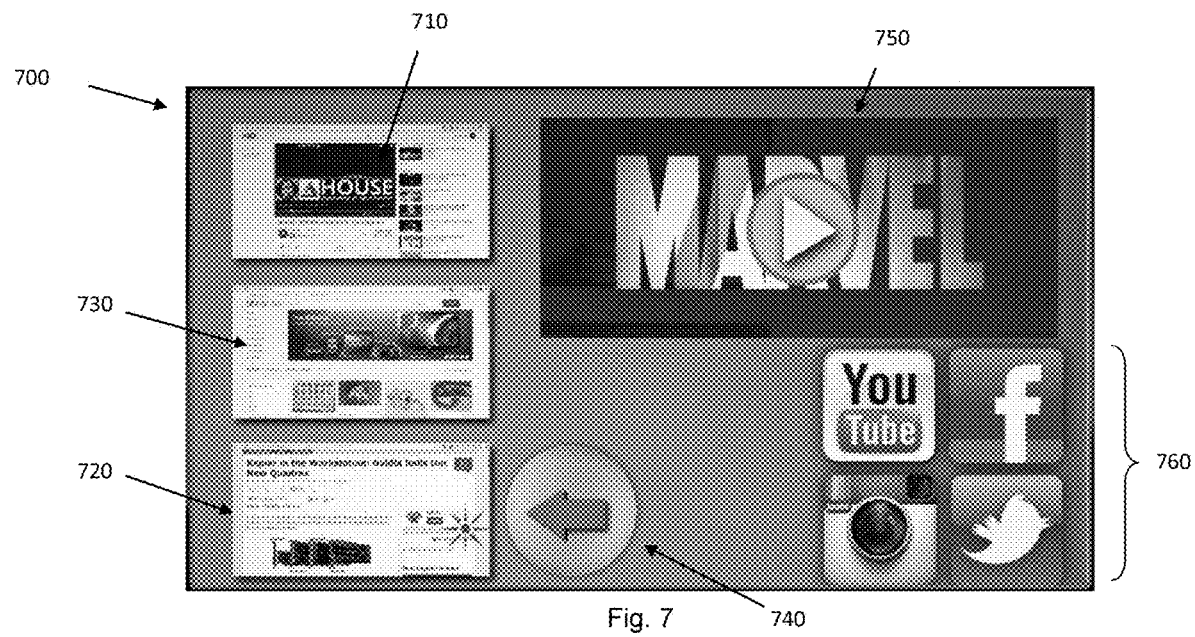
FIG. 7 is an illustration of a parallel page consistent with certain aspects related to innovations herein.

FIG. 7 is an illustration of a parallel page consistent with certain aspects related to innovations herein. On the parallel page 700, there are four parts, the currently playing content 750, icons of social networks 760 (e.g. Facebook, etc.), functionality icons such as a home icon 740 and volume icon, and the opened pages 710-730 (e.g. Chrome pages that users opened before). Users may select the social network icons 760 to comment on or share the content, select the functionality icons 740 to change the settings, go back to the main menu, etc., select the opened pages 710-730 to continue playing that content, or select the currently playing content 750 to change the GUI back to full screen view or some other proportion of that content.

Figure 8:
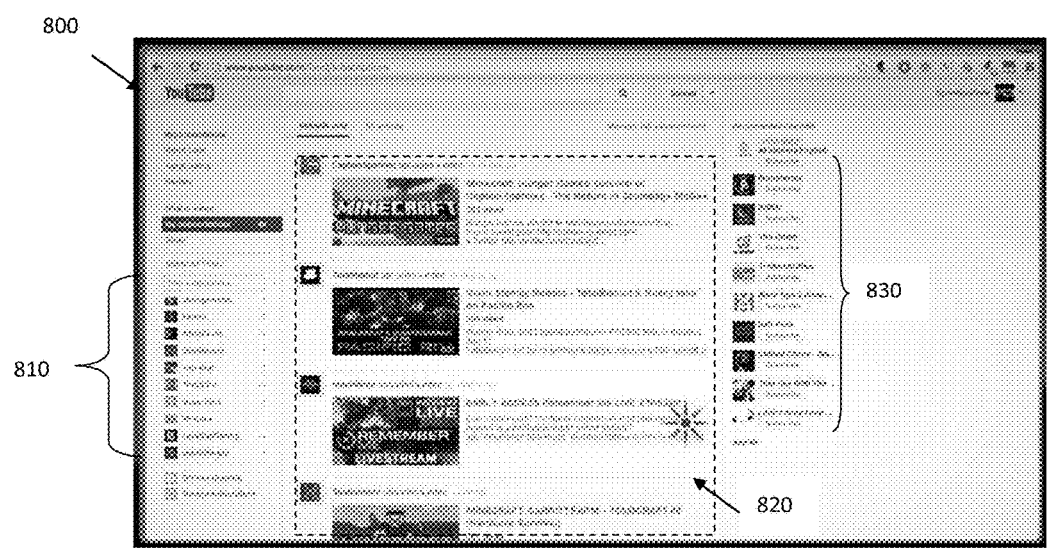
FIG. 8 is an illustration of Internet navigation on the GUI for TV OS consistent with certain aspects related to innovations herein.

FIG. 8 is an illustration of Internet navigation related to operating system GUI features consistent with certain aspects related to innovations herein. According to present systems and methods, for example, a user may move a cursor onto different areas of a webpage 800 to select content from sidebars 810, 830 or from a main area 820. In implementations herein, when the user provides a position on the screen as the pointing input, the cursor will occur at that position. Further, when the user provides a selection (click) input at a certain point, the cursor will select the content that is at that point (e.g. click on a video to play). Implementations may also be configured such that, when the user maintains the selection/click and moves the cursor as a dragging input, the cursor will drag the content until the user releases the clicking, the content will be dragged from the position where the user clicked to the position where the user releases the click.

Figure 9:
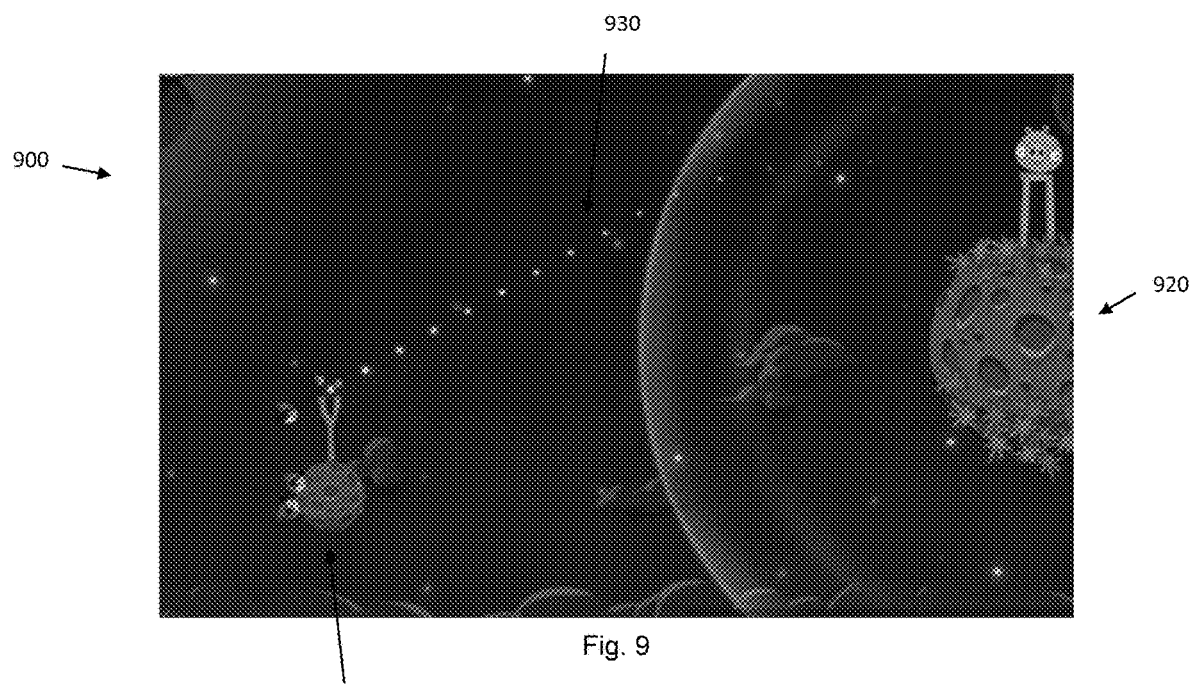
FIG. 9 is an illustration of using Apps on the GUI for TV OS consistent with certain aspects related to innovations herein.

FIG. 9 is an illustration of using Apps involving operating system GUI features consistent with certain aspects related to innovations herein. According to such App functionality, the above-described user movements may be utilized to provide pointing, clicking and dragging as inputs to applications such as a game 900 having selectable elements 910-930.

Figure 10:
FIG. 10 is an illustration of the cursor consistent with certain aspects related to innovations herein.

FIG. 10 is an illustration of the cursor 1010 consistent with certain aspects related to innovations herein. The cursor accepts and/or shows three kinds of input, pointing, clicking and dragging-dropping. If the user does not provide any input, the cursor will not appear on the screen.

Figure 11:
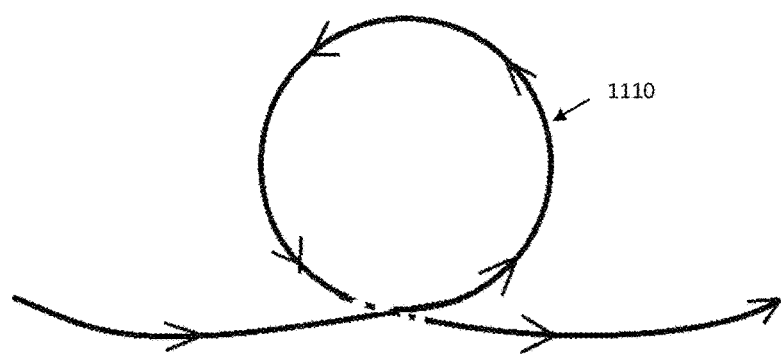
FIG. 11 is an illustration of cycling on the content navigation page consistent with certain aspects related to innovations herein.

FIG. 11 is an illustration of cycling on the content navigation page consistent with certain aspects related to innovations herein. According to one implementation, for example, users may drag content items in the direction of cycling loop 1110 shown by the arrows.

Figure 12:
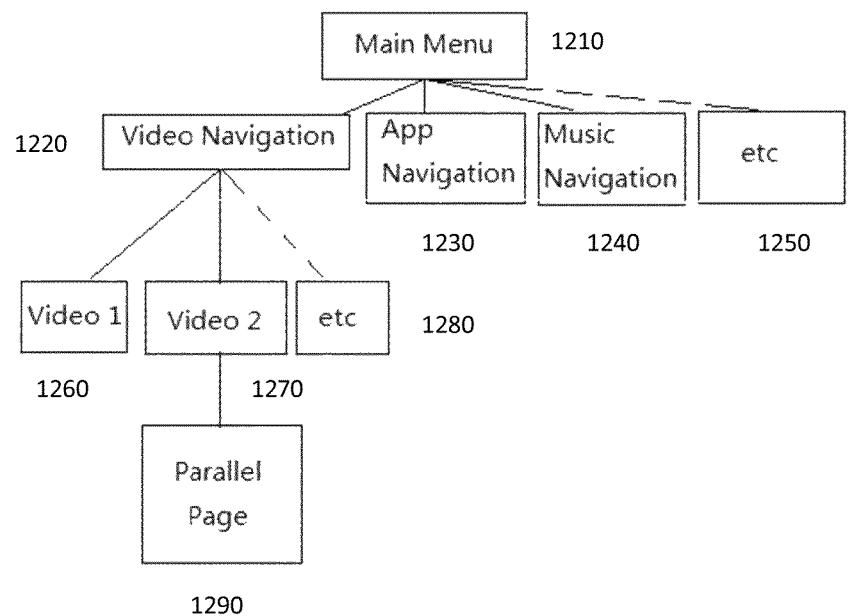
FIG. 12 is a block diagram showing the structure of the GUI for TV OS consistent with certain aspects related to innovations herein.

FIG. 12 is a block diagram showing one illustrative structure of an exemplary operating system GUI consistent with certain aspects related to innovations herein. As set forth in this illustrative structure, from a main menu 1210, a user may select any of video navigation 1220, app navigation 120, music navigation 1240 or other navigation 1250. Further, for example, upon selection of video navigation 1220, further options such first video 1260, second video 1270 and other video 1280 are selectable. Additionally, as set forth above, navigation to an associated 'parallel' page 1290 may then be possible, e.g., via (through and after) selection of the second video 1270.

Figure 13A:
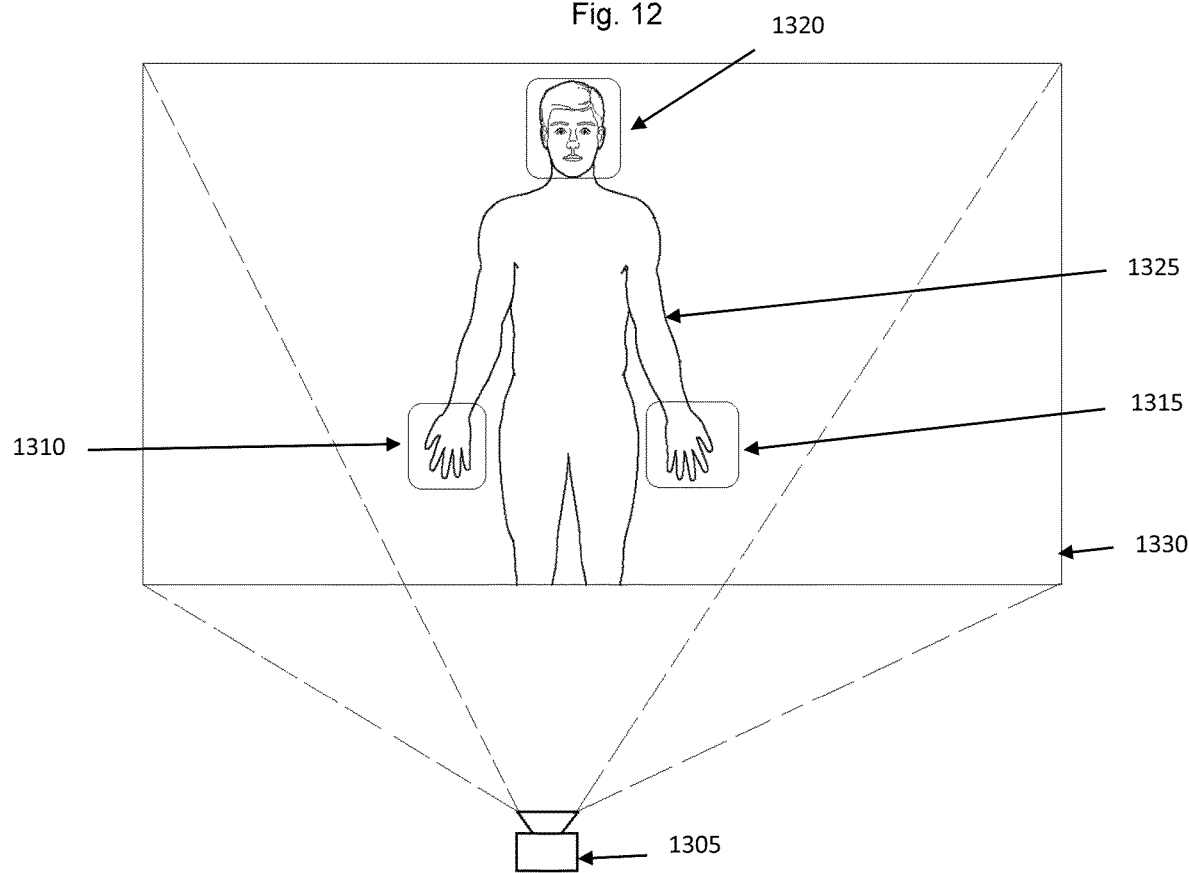
FIGS. 13A-13B are diagrams illustrating various regions and positions of users being captured/detected consistent with certain aspects related to the innovations herein.
Figure 13B:
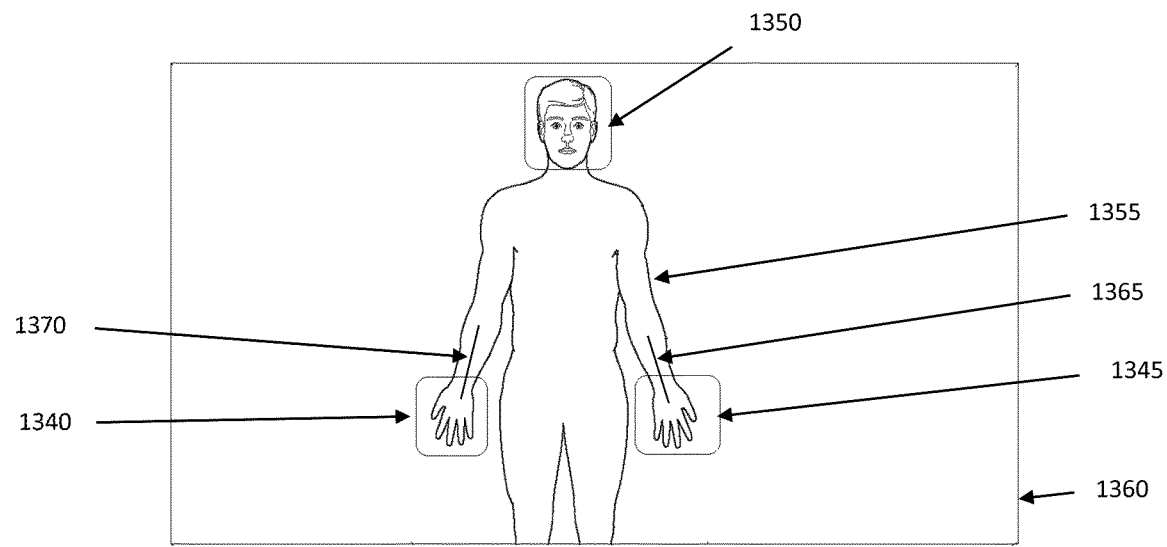
Figure 13B:
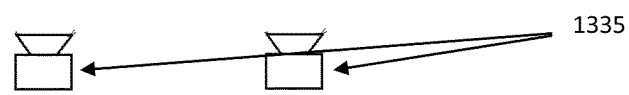

FIGS. 13A-13B are diagrams illustrating various regions and positions of users being captured, detected and/or processed consistent with certain aspects related to the innovations herein. FIG. 13A shows how one user is being captured over a scene region 1330 by one camera 1305. The input program subtracts the background and obtains the contour of the user's body 1325. Based on the contour information, it finds the approximate regions for the user's left hand 1315, right hand 1310 and the face 1320, for gesture and facial recognition. FIG. 13B illustrates the similar idea but with two synchronized parallel cameras 1335 being utilized. Each camera 1335 takes real-time 2D images of the scene 1360, and the input program analyzes the two sets of 2D images 1360 taken by the two cameras 1335 at the same time. For each of the two cameras 1335, the input program obtains the user's contour 1355, approximate left hand region 1345, approximate right hand region 1340 and approximate face region 1350, and it also calculates the 2D coordinates of the user's front-arm central lines 1365 and 1370 by performing statistical regression on the arm points in the contour. And then, the input program uses the two synchronized sets of 20 coordinates of the user's front-arm central lines 1365 and 1370 obtained from both cameras 1335 to calculate the positions and directions of the user's arms in real-world 3D space coordinates. As in other embodiments, the cameras 1305, 1335 are not accompanied by associated and dedicated active illumination devices. One of ordinary skill in the art will appreciate that this means the cameras 1305, 1335 are configured to capture ambient-lit images. Accordingly, the processed images are ambient-lit images.

Figure 14A:
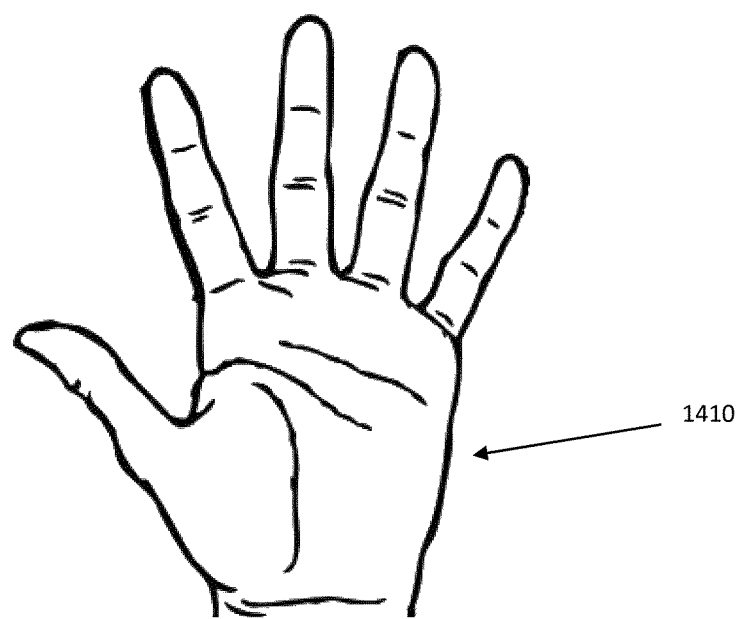
FIGS. 14A-14C are diagrams illustrating various hand positions and hand gestures of users being captured/detected consistent with certain aspects related to the innovations herein.
Figure 14B:
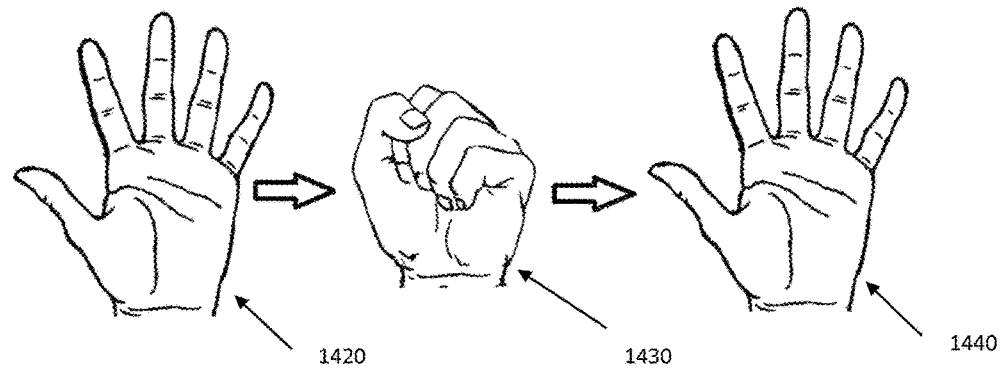
Figure 14C:
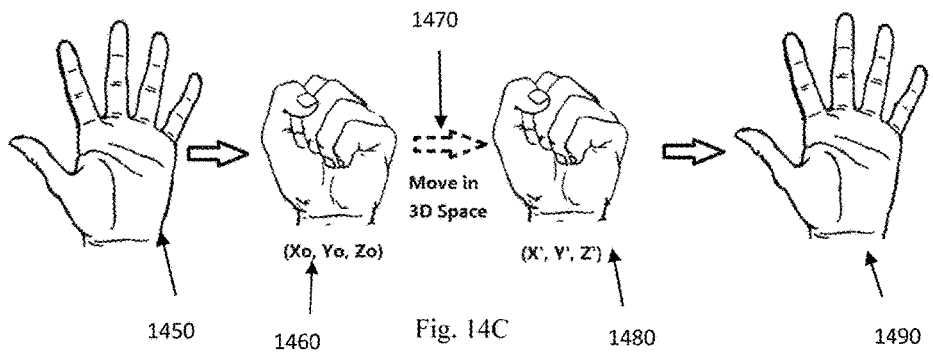

FIGS. 14A-14C are diagrams illustrating various hand positions and hand gestures of users being captured/detected consistent with certain aspects related to the innovations herein. According to some implementation, the input program may be configured to accept three kinds of gestures: pointing, clicking and dragging. In some such systems, absent recognition of these three gestures, the system will not interact with users. If the system recognizes one or more of these three gestures, it will send both the gesture command(s) and the position of the hand(s) to the driver program as inputs. FIG. 14A shows an example of pointing gesture: a fully open hand 1410. FIG. 14B shows an example of clicking gesture sequence: a fully open hand 1420, which closes completely 1430, followed by being fully opened again 1440, e.g., at the same 3D space position. FIG. 14C shows an example of dragging gesture sequence: a fully open hand 1450, which closes completely 1460, e.g., at the same 3D space position, and then moves in 3D space 1470 to another 3D space position 1480 followed by being fully opened again 1490, e.g., at the same position. While several specific actions/gestures have been described to implement these functions, other actions/gestures may also be utilized and are within the scope of certain implementations herein.

Figure 15:
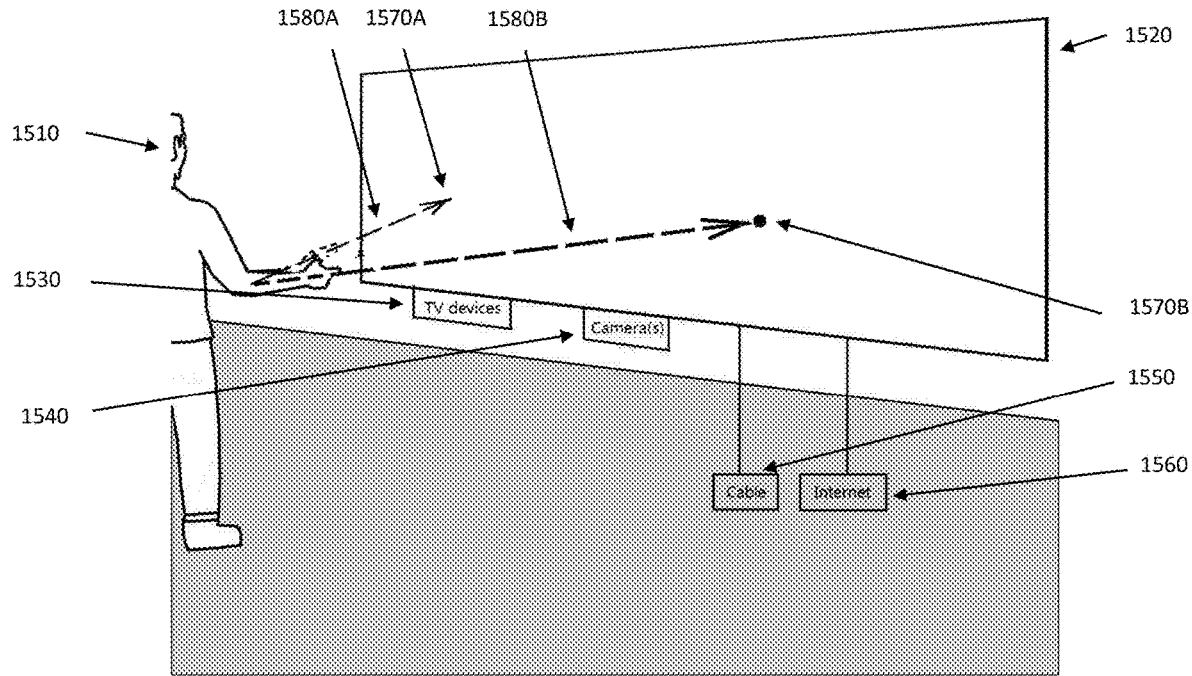
FIG. 15 is a diagram illustrating several different pointing positions of a user's hand and arm as detected/processed consistent with certain aspects related to the innovations herein.

FIG. 15 is a diagram illustrating several different pointing positions of a user's hand and arm as detected/processed consistent with certain aspects related to the innovations herein. In FIG. 15, a display 1520, a TV or processing device, and camera(s) 1540 are provided where the display 1520 generates a cursor 1570A and 1570B as a function of gesture inputs 1580A and 1580B of a user 1510 recorded by camera 1540. The display 1520 and the TV or processing device may be further connected to one or more networks, such as the internet 1560, cable 1550 services, etc. The cursor 1570A and 1570B appear exactly at the positions to which the user is pointing 1580A and 1580B. In this way, if the user moves the cursor from the position 1570A to the position 1570B, the user does not need to make a coherent hand movement from 1580A to 1580B to move the cursor (e.g., as is required with a computer mouse). Instead, the user only needs to stop pointing at the position 1570A and then point at the position 1570B (like how a touch screen works but now remotely). As in other embodiments, the cameras 1540 are not accompanied by associated and dedicated active illumination devices. One of ordinary skill in the art will appreciate that this means the cameras 1540 are configured to capture ambient-lit images. Accordingly, the processed images are ambient-lit images.

Figure 16:
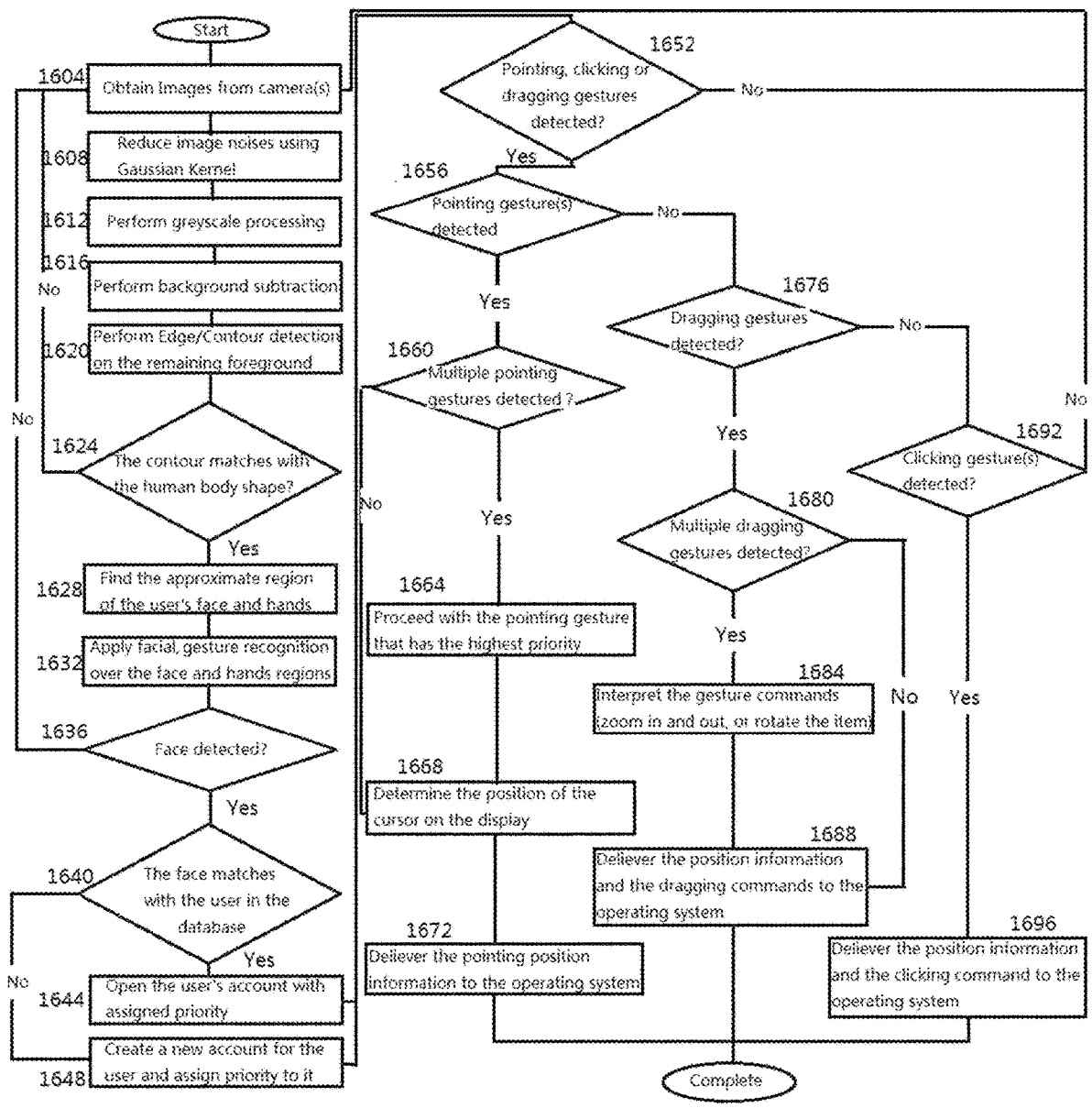
FIG. 16 is a flow diagram illustrating various aspects of processing user information and detected user inputs/gestures consistent with certain aspects related to the innovations herein.

FIG. 16 is a flow diagram illustrating various aspects of the input program processing user information and detected user inputs/gestures consistent with certain aspects related to the innovations herein. According to the illustrative processing shown in FIG. 16, the input program obtains real-time 2D images from a single camera or multiple synchronized cameras, at 1604. Next, some implementations may apply Gaussian processing to the images to reduce noises, at 1608, and/or perform greyscale processing, at 1612. The input program may then first take an image of the background with no users in the scene as pre-setting, and then perform background subtraction by subtracting the pixels that appear to be the same on the background image, at 1616. The input program may then perform edge detection on the remaining foreground to find the contour of objects, at 1620. If one or more contours of the detected objects matches with the human body shape and features, the input program proceeds. If not, the input program may terminate the analysis on the current image and obtains the next image from the camera, at 1624. Next, at 1628, the input program may identify the approximate regions of the user's face and hands, such as by assuming that these three objects are at the upper, left and right ends of the user's body. At 1632, the input program may then apply facial and/or gesture recognition over these three small regions to identify the user's face and gestures. Since recognition methods are time-consuming and computationally expensive, applying recognition only on the three small regions greatly reduces the CPU-time of the program, enabling the input program to run in real-time with relatively low CPU and RAM utilization. If one or more faces are recognized from the facial recognition over the approximate face region(s) on the contour(s), the contour(s) is/are confirmed to be the human body contour(s), and the input program proceeds. Otherwise the program terminates the analysis on the current image and obtain the next image from the camera 1636. Further, user accounts in the software system may be utilized to store users' face images for recognition. If the face obtained matches with one user's facial information stored in the system 1640, the system will start with that user's account 1644. If multiple faces obtained match with multiple users' facial information stored in the system 1640, the system will ask the users about which account they would like to proceed with and then it will start with the account chosen by the user(s) 1644. If the face detected does not match with any users' facial information stored in the system, the system will create a new account for the user and enable this user to do settings including his/her name and control priority 1648. The input system may then identify the gestures in the approximate hand regions according to FIG. 14A-14C. If any of the pointing, clicking or dragging gestures are detected, the input program terminates the analysis over the current image and obtain the next image from the camera 1652. Next, the input program may utilize either 2D processing (e.g., FIG. 17A-17B, etc.) or 3D processing (e.g., FIG. 18A-18D, etc.) to determine the relationship between the cursor position on the display and the hand position and direction. Moreover, as set forth above, the input program may enable multi-user and multi-hands operations. If multiple users attempt to control the system simultaneously, the user who has been assigned a higher priority in the settings will take precedence, at 1664. The program may include configurations for if multiple pointing and/or clicking gestures of one user are detected, for example, the left/right hand with the higher priority in the settings may be given control, while the right/left hand with the lower priority may perform shortcut operations. If multiple dragging gestures of one user are detected 1680, the input program may interpret the commands by recognizing the paths of the hands' movements (e.g., for zoom in, zoom out, rotate the item, and/or other shortcuts and/or operations) 1684. Finally, the input program may deliver both the gesture command(s) and the position of the hand(s) to the driver program as inputs, and the driver program communicates with the operating system to give commands to the cursor. As in other embodiments, the cameras 1604, 1652 are not accompanied by associated and dedicated active illumination devices. One of ordinary skill in the art will appreciate that this means the cameras 1604, 1652 are configured to capture ambient-lit images. Accordingly, the processed images are ambient-lit images.

Figure 17A:
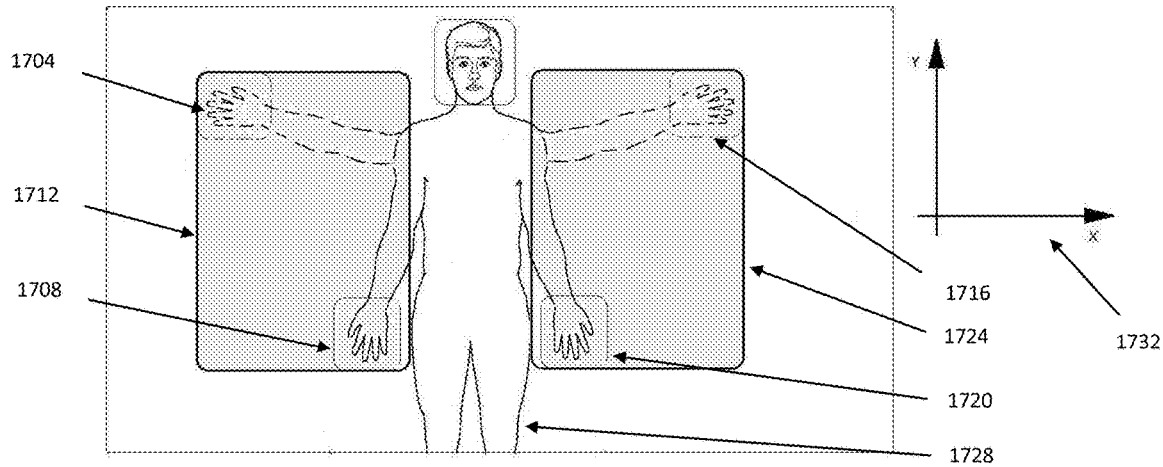
FIG. 17A-17B are diagrams illustrating a 2D method that determines the relationship between cursor position and gestures with hand positions.
Figure 17B:
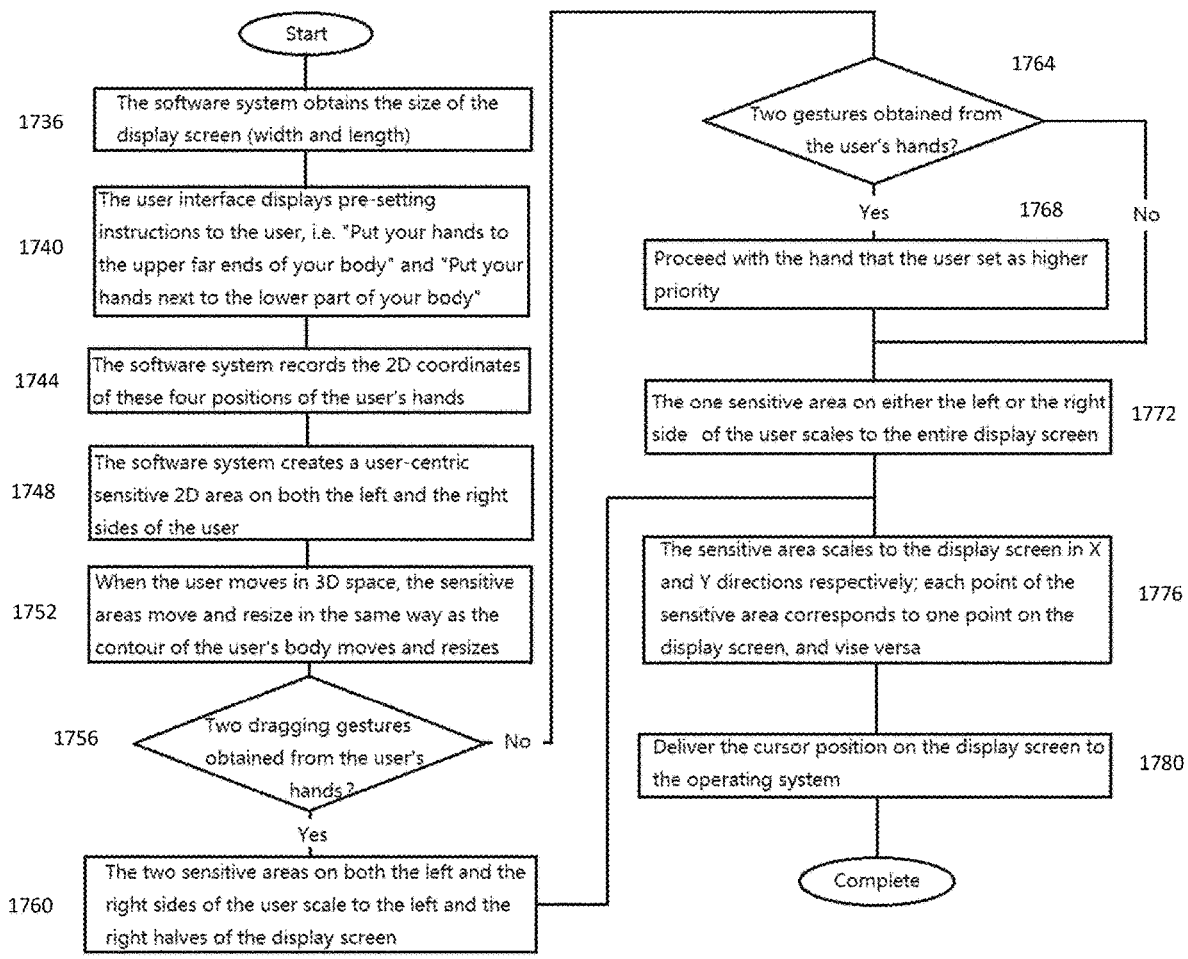

FIG. 17A-17B are diagrams illustrating the input program 2D method using a single camera in determining the relationship between the user's hand position and the cursor position on the display (e.g., step 1668 of FIG. 16) consistent with certain aspects related to the innovations herein. FIG. 17A shows an image taken by the camera utilized for the processing/analysis herein. As set forth, e.g., in connection with FIGS. 13A and 16, the input program may obtain the contour of the user 1728 and the approximate regions of face and hands 1704, 1708, 1720 and 1716. Then, implementations may be configured to allow the user to set the size of the sensitive regions 1712 and 1724 in the input program by placing his/her hands in the air to set the boundaries of the sensitive regions during the pre-setting process. The sensitive region(s) is/are scaled to the entire display screen in both x and y directions 1732, and the position of the hand in the sensitive region corresponds to the position of the cursor on the display screen. FIG. 17B is a block diagram showing the 2D method process. According to the exemplary process shown, the software may first obtain the size of the display screen in terms of its length and width, at 1736. The input program displays pre-setting instructions (e.g. "Please put your hands to the upper far ends of your body" and "Please put your hands to the lower near ends of your body"), at 1740, and the user places his/her hands in the air accordingly. The input program may then record the 2D coordinates of the four hand positions in the camera system and sets the boundaries of the sensitive regions, at 1744. The size and position of the sensitive region are user-centric and only depend on the contour of the user, at 1748. After the pre-setting process, if the user moves in 3D space, the size and position of the sensitive region will change in the same way as the size and position of the user's contour changes 1752. Further, the input program may support multi-hand dragging operations. If two dragging gestures are detected from one user, the two sensitive regions on both the left and the right sides of the user will scale to the left and right halves of the display screen 1760. If two pointing or clicking gestures are detected from one user, the left/right hand with the higher priority in the settings will have the control and the left/right sensitive region will scale to the entire display screen 1772. The length and width of the sensitive region may be set to correspond to the length and width of the display screen. Further, the ratio between the movement of the user's hand in x direction and the movement of the cursor in x direction is the same as the ratio between the width of the sensitive region and the width of the display screen. The ratio between the movement of the user's hand in y direction and the movement of the cursor in y direction is the same as the ratio between the length of the sensitive region and the length of the display screen, 1776. The input program may then deliver the cursor position to the driver to control the cursor on the display. In this way, the user can set the any size he/she wants for the sensitive regions so that he/she can use relative small hand movements to make big cursor movements, which makes the system less tiring to use. As in other embodiments, the cameras are not accompanied by associated and dedicated active illumination devices. One of ordinary skill in the art will appreciate that this means the cameras are configured to capture ambient-lit images. Accordingly, the processed images are ambient-lit images.

With regard to specific implementations herein, an illustrative algorithm takes as input real-time images from the camera. As described above, these images may be ambient-lit images. The images may then be processed with a Gaussian kernel to reduce noise caused by irregular lighting, smudges on the lenses, or other irregularities in the image capture system. The images, presumably 3-channel color images, are then transformed to a 1-channel greyscale image which is fed into a foreground extraction algorithm; the simplest example of which is simple background subtraction followed by thresholding-a background image taken during the algorithm's initialization and guaranteed to be empty of the object(s) being tracked is subtracted from the frame being processed; the pixels of the resulting image are passed through a threshold test to determine if they should be kept-although other more robust algorithms may be utilized without departing from the scope of implementations described herein. The result of these steps is an image containing the object(s) being tracked-preferably but not necessarily given in the form of the object's contour, as well as possibly undesired objects or artifacts of the process. The selection step taken to choose the correct object as the foreground to be processed further, and therefore when the object being tracked should be converted to its defining contour if it is not already given in such a form by previous steps, is generally dependent on the type of foreground extraction algorithm used. For background subtraction, the selection step might include choosing the largest contiguous object (by area). The selection step must also include testing the prospective contour to see if it resembles a human body, specifically with distinguishable arms, hands, and face. One such test that is simple to perform is to determine whether or not the contour is convex. In almost any conceivable orientation, the human body appears to be concave, therefore all convex contours cannot-are presumed not to behuman-like. Further tests can be performed during later steps in the algorithm to ensure errant data is not generated from non-human objects.

The desired contour having been selected from the image, and guaranteed not to be convex, its convex hull is now calculated, which may then be defined as the contour's smallest possible bounding convex polygon. From its contour and the convex hull, the convexity defects are then determined. The largest convexity defects are presumed to be between the head and the arm and in the armpit on the side of the arm being tracked. If one arm is tracked, then these two contours must be present or the contour is presumed to be non-human and the current frame is dropped. If two arms are being tracked then four such defects must be found. These defects are then used to delineate regions in which the arm must be found, ideally by extending the defect vectors to the boundaries of the image. All points in the contour that are also in the arm region are selected to form a contour of the arm. Statistical regression can then be run over these points to find the central line of an arm. All points in the convex hull (also a contour) that are also in the arm region are selected separately, and the average of them calculated. This weighted average is chosen as the point of raw cursor-the convex hull should exclude most points on the arm which are part of the defect region and the arm region, constructed from the convexity defect vectors is guaranteed to exclude all non-arm points leaving only, or at least predominantly points clustered around the hand.

The raw cursor can then be passed through a running average of a set number of frames to smooth inconsistencies and scaled to the entire useable screen from a predefined region set on the program's initialization. Here, then, the relationship between the cursor position on the display and the user's hand position in the sensing region is established, such that each sensing coordinate within the sensing region corresponds to a display coordinate within the display screen. In this way, the input program can determine the cursor position on the display with the calculated user's hand position in the camera coordinates system.

Figure 18A:
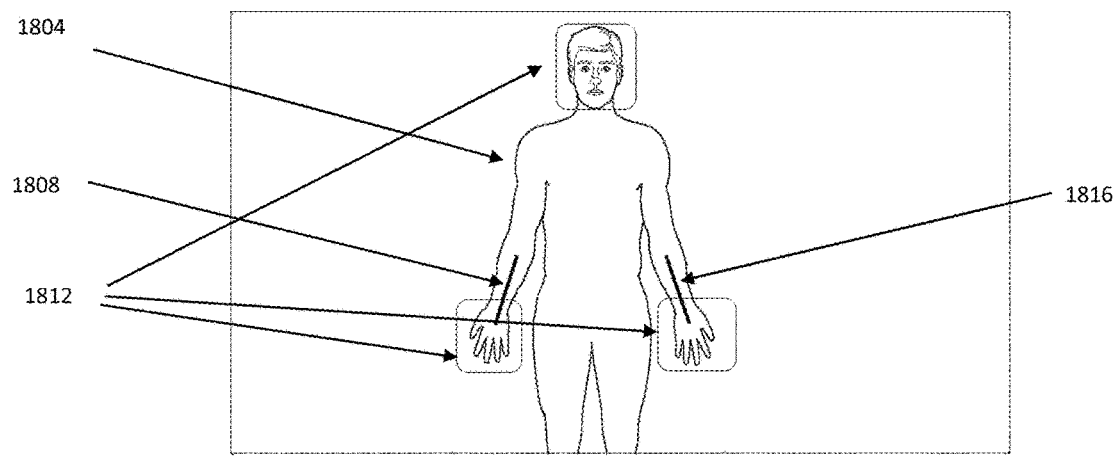
FIG. 18A-18D are diagrams illustrating a 3D method that determines the relationship between cursor position and gestures with hand positions.
Figure 18B:
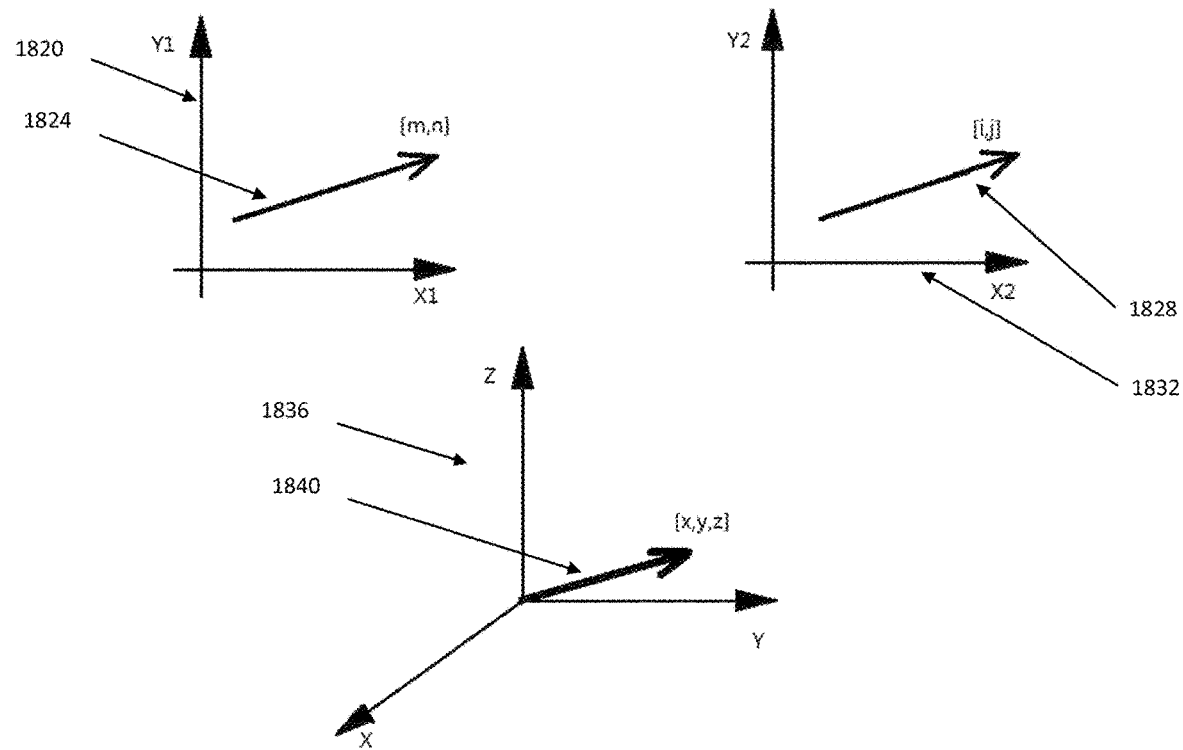
Figure 18C:
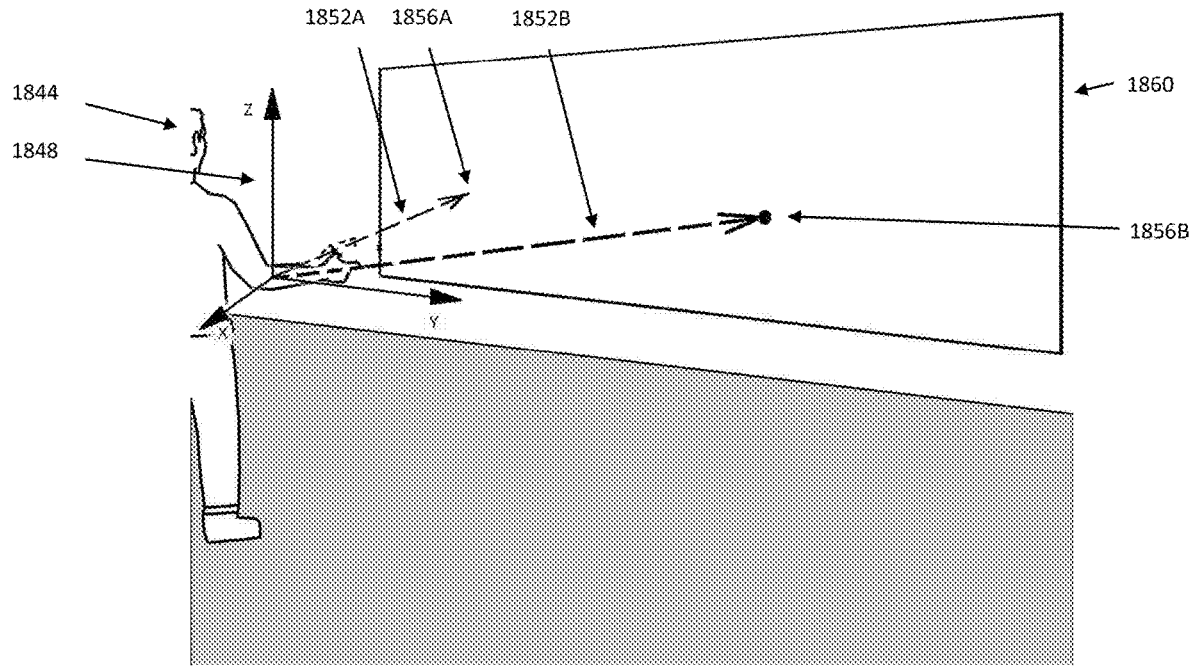
Figure 18D:
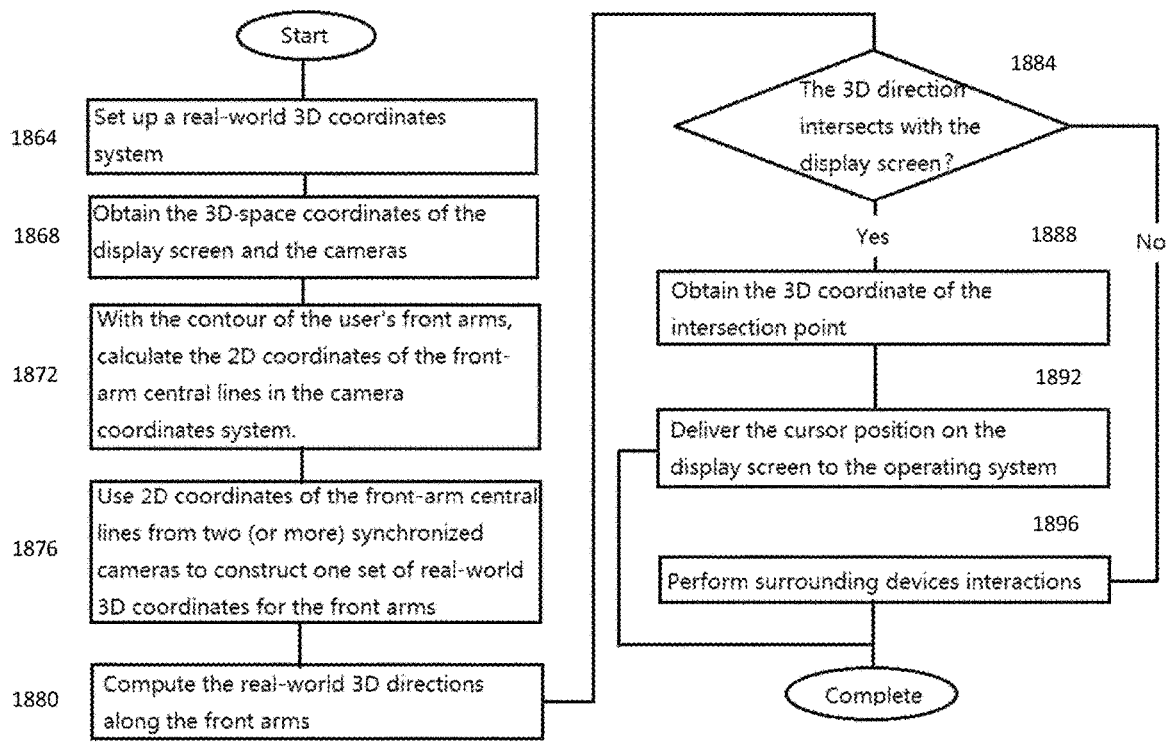

FIG. 18A-18D are diagrams illustrating the input program 30 method using multiple synchronized cameras in determining the relationship between the user's hand position and the cursor position on the display (see, e.g., step 1668 of FIG. 16) consistent with certain aspects related to the innovations herein. FIG. 18A shows an image taken by a single camera with the analysis. As set forth in connection with FIGS. 13B and 16, the input program obtains the contour of the user 1804, the approximate regions of face and hands 1812 and the 2D coordinates of the front-arm central lines 1816 and 1808. FIG. 18B illustrates how to use the fundamental matrix to convert the two sets of synchronized 20 coordinates and directions obtained from the two cameras 1820, 1824, 1828 and 1832 into one set of real-world 3D coordinates and direction 1836 and 1840. FIG. 18C shows an example of using this 3D method to determine the cursor position 1856A and 18568 on the display 1860 based on the user's hand position and direction 1852A and 18528 within the real-world 30 coordinates system 1848. FIG. 18D is a block diagram illustrating the 3D method process. First, the input system sets up a real-world 3D coordinates system, at 1864, and then obtains the 3D coordinates of the boundaries of display screen and the multiple synchronized cameras, at 1868. Then, based on the contour information obtained from each camera, the input program calculates multiple sets of the 2D coordinates of the position and the direction of the user's front-arm central lines, at 1872. Next, the input program uses the fundamental matrix to convert the multiple sets of synchronized 2D coordinates into one set of the real-world 3D coordinates for the 3D position and 3D direction of the user's front arms, at 1876. In this way, the user can stay at one position in the room and use his/her front arm to point to any position in that 3D space. If the 3D direction intersects with the display screen, at 1884, the input program calculates the 3D coordinate of the point on the display where the 3D direction intersects with the display screen, at 1888. If not, the system will perform surrounding devices interaction shown in FIGS. 19A-19B. Finally, the input program may deliver the position of that interaction point to the driver as the cursor position to control the cursor on the display. As in other embodiments, the cameras are not accompanied by associated and dedicated active illumination devices. One of ordinary skill in the art will appreciate that this means the cameras are configured to capture ambient-lit images. Accordingly, the processed images are ambient-lit images.

Figure 19A:
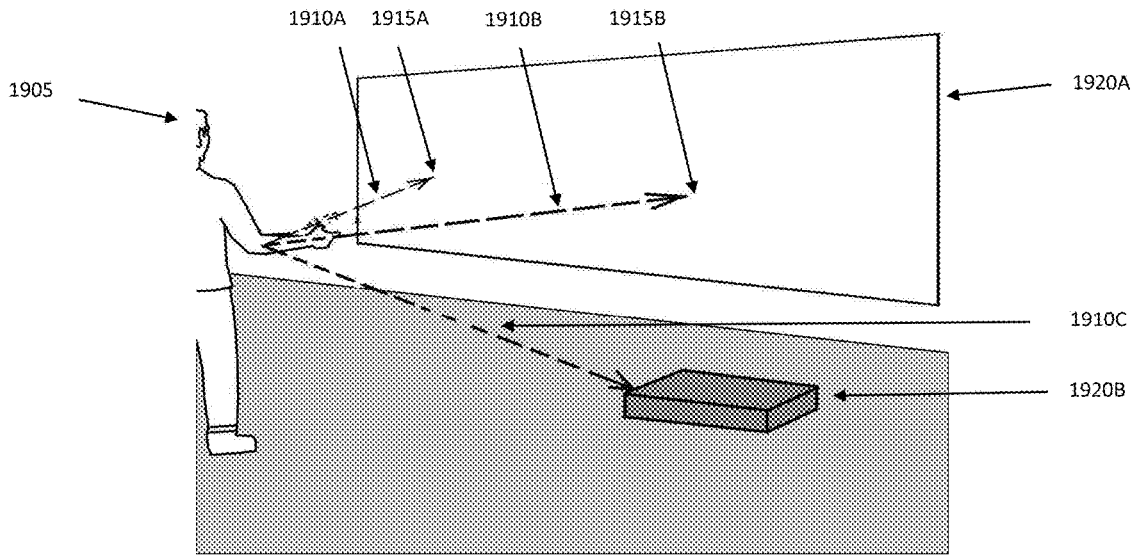
FIG. 19A-19B are diagrams illustrating further applications of the innovations herein including connected devices interactions and device networking.
Figure 19B:
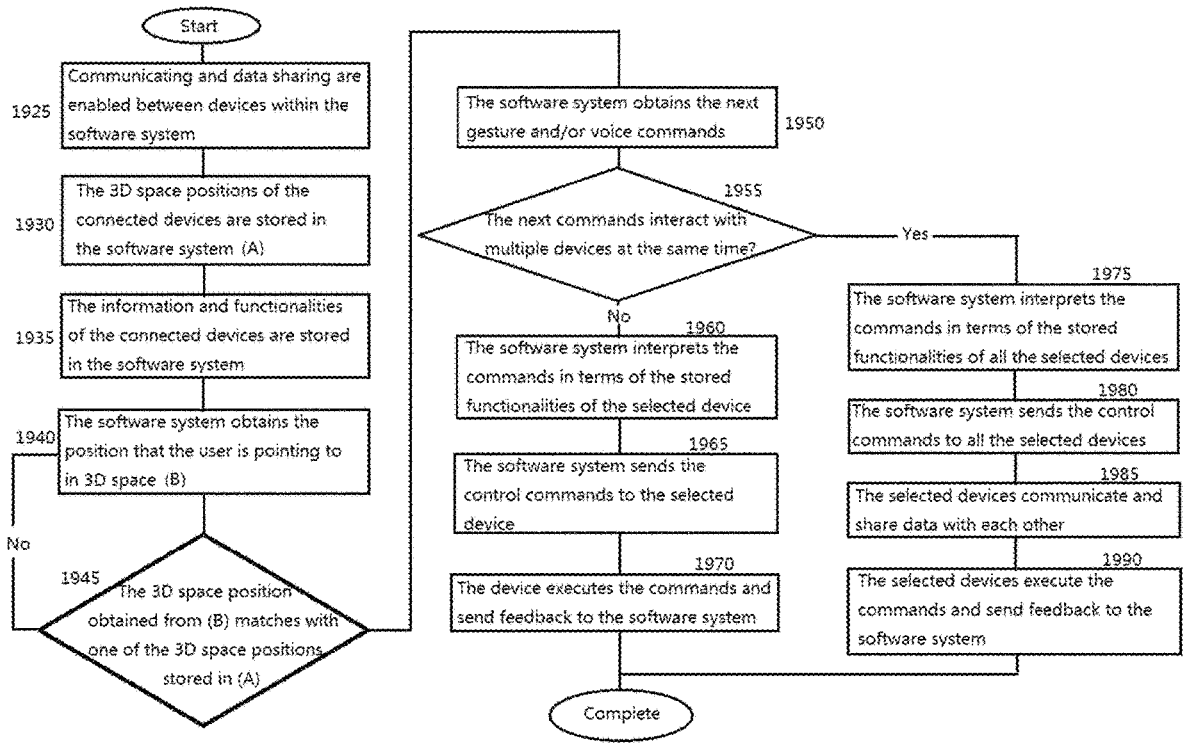

FIG. 19A-19B are diagrams illustrating the interactions with one or more connected devices using 3D input program consistent with certain aspects related to the innovations herein. FIG. 19A shows an example of the user 1905 interacting with both the display device 1920A and connected device 1920B using the 3D gestures 1910A, 1910B and 1910C. The display responds by showing the cursors on the screen 1915A and 1915B. The devices 1920A and 1920B are connected, and they can communicate and share data with each other. The innovative operating systems/platforms herein may create a network for connected devices, and store the 3D position coordinates, detailed information and functionalities of all the connected devices. Users may interact with any of the devices in the network through pointing, clicking or dragging gesture or with other inputs. Moreover, the users may interact with multiple devices in the network at the same time. For example, users can use the dragging gesture to drag a song from the Smart TV screen 1920A to play on a stereo system 1920B connected with the network. FIG. 19B is a block diagram illustrating the interacting process. First, the devices are connected (wired or wireless) with each other and the software systems on all of the connected devices are able to communicate and share data with other systems 1925. Next, the 3D coordinates of the positions of all the connected devices are stored in the software system, at 1930. Then, information and functionalities of each connected device may be stored in the software system, at 1935. Next, the software system obtains the 3D coordinates of the position and direction that the user is pointing to as showed in FIG. 18A-18D 1940. If the 3D direction obtained intersects with one of the 3D position coordinates of the connected devices, the software system will obtain the further commands from the user in terms of pointing, clicking or dragging, at 1950. If the further commands interact with only one connected device, at 1955, the software system interprets the commands in terms of the stored functionalities of the selected device and sends the control commands to the selected connected device 1965. The device may then execute the control commands and send feedback to the software system, at 1970. If the further commands interact with more than one connected device, at 1955, the software system interprets the commands in terms of the stored functionalities of all the selected devices and sends control commands to the all the selected devices, at 1980. The selected device communicate and share data with each other according to the control commands, at 1985. And they execute the control commands and send feedback to the software system, at 1990.

Implementations and Other Nuances

The innovations herein may be implemented via one or more components, systems, servers, appliances, other sub-components, or distributed between such elements. When implemented as a system, such system may comprise, inter alia, components such as software modules, general-purpose CPU, RAM, etc. found in general-purpose computers, and/or FPGAs and/or ASICs found in more specialized computing devices. In implementations where the innovations reside on a server, such a server may comprise components such as CPU, RAM, etc. found in general-purpose computers.

Additionally, the innovations herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, appliances, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices. Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and other non-transitory media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Other non-transitory media may comprise computer readable instructions, data structures, program modules or other data embodying the functionality herein, in various non-transitory formats. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., Silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the inventions have been specifically described herein, it will be apparent to those skilled in the art to which the inventions pertain that variations and modifications of the various implementations shown and described herein may be made without departing from the spirit and scope of the inventions. Accordingly, it is intended that the inventions be limited only to the extent required by the applicable rules of law.

The invention claimed is:

1. A method of gesture processing, the method comprising:
   capturing ambient-lit image data from at least one two-dimensional imaging camera;
   analyzing the ambient-lit image data to identify an image of at least one user within the ambient-lit image data; and
   determining a command for a device and/or an input position based on the analyzed ambient-lit image data.

2. The method of claim 1, wherein the device is a display, and wherein the input position and/or command for the display based on the analyzed image data is determined by:
   generating at least one sensing region based on the captured image data;
   determining a hand or appendage position within the at least one sensing region; and
   scaling dimensions of the at least one sensing region to dimensions of the display such that each sensing coordinate within the at least one sensing region corresponds to a display coordinate within the display;
   wherein the hand or appendage position corresponds to the input position and/or command of the display.

3. The method of claim 2 wherein the appendage is a hand, finger and/or thumb.

4. The method of claim 2 wherein the appendage is a front arm.

5. The method of claim 4 wherein the front arm is a forearm.

6. The method of claim 2 wherein the sensing region is based on a predetermined user hand position.

7. The method of claim 2 further comprising:
   resizing the sensing region based on user movement in three-dimensional space.

8. The method of claim 1, wherein the input position is in three-dimensional space, wherein the command for the device and/or the input position in three-dimensional space is determined by:
   determining three-dimensional coordinates of the user arm or appendage;
   extending the three-dimensional coordinates of the user arm or appendage;
   determining an intersection point of the device with the extended user arm or appendage; and
   determining the input position and/or command corresponding to the intersection point.

9. The method of claim 8, further comprising:
   determining three-dimensional coordinates for a plurality of devices;
   associating the command and/or the input position with the plurality of devices; and
   communicating data between the plurality of devices based on the command and/or the input position.

10. The method of claim 1 wherein the command for a device and/or the input position is a pointing gesture, a dragging gesture or a clicking gesture.

11. The method of claim 1 further comprising:
    determining a user based on the analyzed ambient-lit image data;
    associating the user with a user account of an operating system; and
    assigning a priority to the user.

12. The method of claim 11 further comprising:
    processing gestures from a plurality of users based on the user priority, including processing gestures in the ambient-lit image data from a highest-priority gesturing user even when a higher-priority non-gesturing user having a higher priority is present in the ambient-lit image data but not gesturing.

13. The method of claim 1 wherein the pointing gesture determines position of a cursor on a display.

14. The method of claim 1 wherein the ambient-lit image data analysis comprises at least one of image noise reduction, greyscale processing, background subtraction and edge/contour detection.

15. The method of claim 1 wherein the image data analysis comprises:
    determining a contour of a user body;
    determining a position a user hand or appendage from the contour; and
    performing hand or appendage gesture recognition over the position to determine pointing, clicking and dragging gestures.

16. The method of claim 1 wherein the ambient-lit image data analysis comprises performing facial recognition processing.

17. The method of claim 1 wherein the command for a device and/or an input position is based on a plurality of hand gestures.

18. The method of claim 1 wherein the command for a device and/or an input position is based on a plurality of hand gestures for zoom in, zoom out or rotation.

19. A method of gesture processing, the method comprising:
- capturing ambient-lit image data from at least two two-dimensional imaging cameras;
- performing image noise reduction, greyscale processing, background subtraction and edge/contour detection for body recognition processing and gesture recognition processing on the ambient-lit image data;
- determining a pointing gesture, a dragging gesture or a clicking gesture based on the gesture recognition processing; and
- transmitting a command to an operating system corresponding to the determined gesture.

\* \* \* \* \*